(12) United States Patent
Li et al.

(10) Patent No.: US 12,520,277 B2
(45) Date of Patent: Jan. 6, 2026

(54) REPEAT TRANSMISSION PAGING METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 452 days.

(21) Appl. No.: 18/082,941

(22) Filed: Dec. 16, 2022

(65) Prior Publication Data

US 2023/0117315 A1   Apr. 20, 2023

Related U.S. Application Data

(63) Continuation of application No. PCT/CN2020/100256, filed on Jul. 3, 2020.

(51) Int. Cl.
*H04W 68/02* (2009.01)
*H04W 24/08* (2009.01)
*H04W 56/00* (2009.01)
*H04W 72/1273* (2023.01)

(52) U.S. Cl.
CPC ........... *H04W 68/02* (2013.01); *H04W 24/08* (2013.01); *H04W 56/001* (2013.01); *H04W 72/1273* (2013.01)

(58) Field of Classification Search
CPC ... H04W 68/02; H04W 24/08; H04W 56/001; H04W 72/1273; H04W 24/00–10; H04W 56/00–0095; H04W 68/00–12; H04W 72/00–569; H04B 7/06952; H04B 7/0695–088
See application file for complete search history.

(56) References Cited

U.S. PATENT DOCUMENTS

2020/0092833 A1*  3/2020  Agiwal .............. H04W 72/23
2021/0385785 A1  12/2021  Lee
2023/0033126 A1   2/2023  Agiwal

FOREIGN PATENT DOCUMENTS

| CN | 110621073 A | 12/2019 | |
| CN | 111294943 A | 6/2020 | |
| WO | 2020032868 A1 | 2/2020 | |
| WO | WO-2020055102 A1 * | 3/2020 | ............ H04W 68/02 |

(Continued)

OTHER PUBLICATIONS

Supplementary European Search Report in the European application No. 20943738.3, mailed on Jun. 29, 2023. 12 pages.

(Continued)

*Primary Examiner* — Ronald Eisner
(74) *Attorney, Agent, or Firm* — BAYES PLLC

(57) ABSTRACT

A repeat transmission paging method comprises: a terminal device determines a physical downlink control channel (PDCCH) monitoring occasion on at least one synchronization signal block (SSB) beam. The maximum number of the PDCCH monitoring occasion is a product of the number of SSB beams on which a network device transmits a paging PDCCH and the maximum number of retransmissions of the paging PDCCH on each SSB beam.

12 Claims, 11 Drawing Sheets

A terminal device determines a Physical Downlink Control Channel (PDCCH) monitoring occasion on at least one Synchronization Signal Block (SSB) beam, the maximum number of the PDCCH monitoring occasion being a product of the number of SSB beams on which a network device transmits a paging PDCCH and the maximum number of retransmissions of the paging PDCCH on each SSB beam — S201

The terminal device determines a candidate PDCH set corresponding to each number of retransmissions of the paging PDCCH — S202

The terminal device detects the paging PDCCH on the candidate PDCCH set by taking the number of retransmissions of the paging PDCCH on each SSB beam as a dimension — S203

(56) References Cited

FOREIGN PATENT DOCUMENTS

| WO | 2020068290 | A1 | 4/2020 |
|----|------------|----|----|
| WO | 2020092095 | A1 | 5/2020 |

OTHER PUBLICATIONS

Huawei et al., "Consideration on PDCCH monitoring occasion and No. of monitored DCIs", 3GPP TSG RAN WG1 Meeting #93 R1-1807305, Busan, Korea, May 21-25, 2018.
International Search Report in the international application No. PCT/CN2020/100256, mailed on Apr. 2, 2021.
Written Opinion of the International Search Authority in the international application No. PCT/CN2020/100256, mailed on Apr. 2, 2021.
Ericsson, "New SID on support of reduced capability NR devices", 3GPP TSG RAN Meeting #86 RP-193238, Sitges Spain, Dec. 9-12, 2019.

* cited by examiner

REPEAT TRANSMISSION PAGING METHOD, ELECTRONIC DEVICE, AND STORAGE MEDIUM

CROSS-REFERENCE TO RELATED APPLICATION

This application is a continuation of International Application No. PCT/CN2020/100256 filed on Jul. 3, 2020, the disclosure of which is hereby incorporated by reference in its entirety.

BACKGROUND

In the related art, how to realize the repeat transmission process of a paging Physical Downlink Control Channel (PDCCH) for User Equipment (UE) with low capability has not yet been clear.

SUMMARY

The present application relates to the technical field of wireless communication. Embodiments of the present application provide a repeat transmission paging method, an electronic device, and a storage medium, which may specify the repeat transmission process of a paging PDCCH.

In a first aspect, the embodiments of the present application provide a repeat transmission paging method, which may include that: a terminal device determines a PDCCH monitoring occasion on at least one Synchronization Signal Block (SSB) beam. The maximum number of the PDCCH monitoring occasion is a product of the number of SSB beams on which a network device transmits a paging PDCCH and the maximum number of retransmissions of the paging PDCCH on each SSB beam.

In a second aspect, the embodiments of the present application provide a repeat transmission paging method, which may include that: a network device retransmits a paging PDCCH on a PDCCH monitoring occasion. The maximum number of the PDCCH monitoring occasion is a product of the number of SSB beams on which the network device transmits the paging PDCCH and the maximum number of retransmissions of the paging PDCCH on each SSB beam.

In a third aspect, the embodiments of the present application provide a terminal device. The terminal device may include: a processing unit, configured to determine a PDCCH monitoring occasion on at least one SSB beam. The maximum number of the PDCCH monitoring occasion is a product of the number of SSB beams on which a network device transmits a paging PDCCH and the maximum number of retransmissions of the paging PDCCH on each SSB beam.

In a fourth aspect, the embodiments of the present application provide a network device. The network device may include: a sending unit, configured to retransmit a paging PDCCH on a PDCCH monitoring occasion. The maximum number of the PDCCH monitoring occasion is a product of the number of SSB beams on which the network device transmits the paging PDCCH and the maximum number of retransmissions of the paging PDCCH on each SSB beam.

In a fifth aspect, the embodiments of the present application provide a terminal device, which may include: a processor, and a memory configured to store a computer program capable of running on the processor. Herein, the processor may be configured to perform the steps of the repeat transmission paging method executed by the terminal device as described above.

In a sixth aspect, the embodiments of the present application provide a network device, which may include: a processor, and a memory configured to store a computer program capable of running on the processor. Herein, the processor may be configured to perform the steps of the repeat transmission paging method executed by the network device as described above.

In a seventh aspect, the embodiments of the present application provide a chip, which may include: a processor, configured to call from a memory and run a computer program to enable a device installed with the chip to perform the repeat transmission paging method executed by the terminal device as described above.

In an eighth aspect, the embodiments of the present application provide a chip, which may include: a processor, configured to call from a memory and run a computer program to enable a device installed with the chip to perform the repeat transmission paging method executed by the network device as described above.

In a ninth aspect, the embodiments of the present application provide a storage medium, storing an executable program. The executable program, when executed by a processor, implements the repeat transmission paging method executed by the terminal device as described above.

In a tenth aspect, the embodiments of the present application provide a storage medium, storing an executable program. The executable program implements the repeat transmission paging method executed by the above network device when being executed by a processor as described above.

In an eleventh aspect, the embodiments of the present application provide a computer program product, which may include: a computer program instruction. The computer program instruction enables a computer to perform the repeat transmission paging method executed by the terminal device as described above.

In a twelfth aspect, the embodiments of the present application provide a computer program product, which may include: a computer program instruction. The computer program instruction enables a computer to perform the repeat transmission paging method executed by the network device as described above.

In a thirteenth aspect, the embodiments of the present application provide a computer program, enabling a computer to perform the repeat transmission paging method executed by the terminal device as described above.

In a fourteenth aspect, the embodiments of the present application provide a computer program, enabling a computer to perform the repeat transmission paging method executed by the network device as described above.

DETAILED DESCRIPTION

Figure 1:
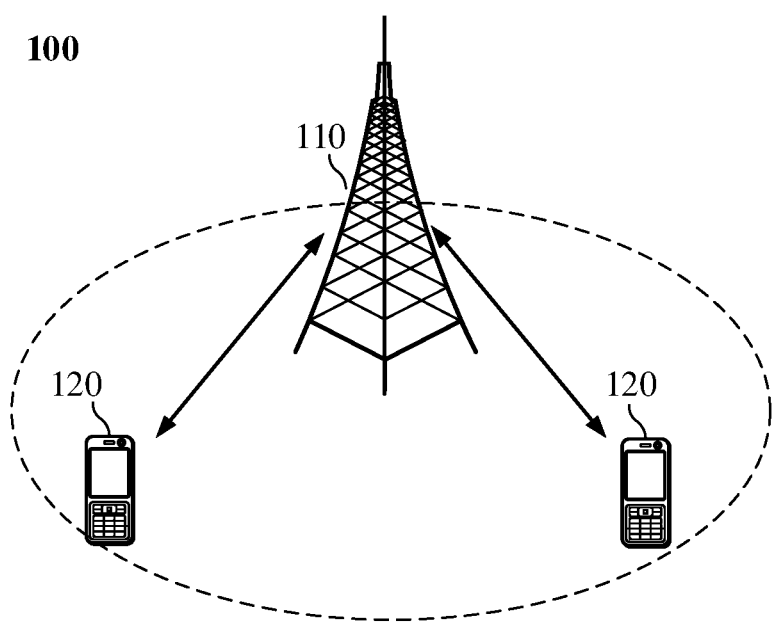
FIG. 1 is a schematic diagram of a composition structure of a communication system according to an embodiment of the present application.

In order to provide a more detailed understanding of the features and technical contents of the embodiments of the present application, implementations of the embodiments of the present application will be described in detail below with reference to the accompanying drawings, and the accompanying drawings are for illustrative purposes only and are not intended to limit the embodiments of the present application.

Before the description of the embodiments of the present application, relevant contents are briefly described.

At present, with the people's pursuit of speed, delay, high-speed mobility and energy efficiency, and the diversity and complexity of services in future life, the third Generation Partnership Project (3GPP) International Standard Organization begins to develop 5G. The main application scenarios of 5G are: Enhanced Mobile Broadband (eMBB), Ultra Reliable Low Latency Communications (URLLC), and Massive Machine Type Communication (mMTC).

A New Radio (NR) system may also be deployed independently. In order to reduce air interface signaling and quickly resume wireless connections and data services, a new Radio Resource Control (RRC) state, namely an RRC-Inactive state, is defined. In an RRC-Idle state, the mobility is cell reselection based on a terminal device, the paging process is initiated by a Core Network (CN), and a paging area is configured by the CN. There is no terminal device context and no RRC connection on a network device side. In the RRC-Inactive state, the mobility is cell reselection based on the terminal device, there is a connection between CN-NR, the terminal device context exists on a certain network device, the paging process is triggered by a Radio Access Network (RAN), the paging area based on the RAN is managed by the RAN, and the network device may know that the position of the terminal device is at the level of the paging area based on the RAN.

A Paging mechanism in the NR system will be described below.

The main function of Paging is that when a terminal device is in the RRC-IDLE state or in the RRC-INACTIVE state, a network device may page the terminal device through a paging message, or notify the terminal device of system message changes, or earthquake and tsunami/public early warning information through a short message. Of course, Paging is also suitable for terminal devices in an RRC connection state, that is, Paging is suitable for all the terminal devices in the RRC state.

The content of Paging may include a PDCCH scrambled by a Paging Radio Network Temporary Identifier (P-RNTI) and a Physical Downlink Shared Channel (PDSCH) scheduled by the PDCCH. The Paging message may be transmitted in the PDSCH. The size of the short message is 8 bits, and the short message may be in the PDCCH.

For a terminal device in the RRC_IDLE state or in the RRC_INACTIVE state, since there is no data communication between the terminal device and the network device, in order to save the electric energy of the terminal device, the terminal device may discontinuously monitor a Paging channel, that is, adopt a Paging Discontinuous Reception (DRX) mechanism. Under the Paging DRX mechanism, the terminal device only needs to monitor paging during one Paging Occasion (PO) in each DRX cycle. The PO includes multiple PDCCH monitoring occasions, and at the same time, the PO may be composed of multiple time slots. A Paging Frame (PF) refers to a radio frame, the duration of the FP is 10 ms, and one PF may contain multiple POs or starting positions of multiple POs.

The DRX cycle is jointly determined by a public cycle in a system broadcast sent by the network device and a specific cycle configured in high-level signaling, and the terminal device may select the minimum cycle between the public cycle and the specific cycle as the DRX cycle. Herein, the high-level signaling may be Non-Access Stratum (NAS) signaling. From the perspective of the network device, there may be multiple POs in one DRX cycle, and the position where the terminal device monitors the POs is related to an Identifier (ID) of the terminal device. Specifically, the determination manners of the PF and the PO for the terminal device in one DRX cycle are as follows (TS 38.304).

The System Frame Number (SFN) of the PF is determined by the following formula:

$$(SFN+PF\_offset) \bmod T = (T \text{ div } N)*(UE\_ID \bmod N) \quad (1)$$

The Index_(i_s) of the PO in one PF is determined by the following formula:

$$i\_s = \text{floor}(UE\_ID/N) \bmod Ns \quad (2)$$

Where, T is the DRX cycle in which the terminal device receives Paging. The network device may broadcast a default DRX cycle. If the network device configures a terminal device-specific DRX cycle for the terminal device through RRC signaling/high-level signaling, then the minimum one of the DRX cycle broadcast by the network device and the terminal device-specific DRX cycle configured by the RRC signaling/high-level signaling is used as the DRX cycle of the terminal device. If the network device does not configure the terminal device-specific DRX cycle for the terminal device through the RRC signaling/high-level signaling, then the DRX cycle broadcast by the network device is used as the DRX cycle of the UE. N is the number of PFs contained in one DRX cycle. Ns is the number of POs contained in one PF. PF-offset is a time domain offset used to determine the PF. UE_ID is 5G-S-TMSI mod 1024.

The terminal device in the idle state or the inactive state may discontinuously monitor the Paging channel, that is, adopt the DRX mechanism. Under the Paging DRX mechanism, the terminal device only needs to monitor the PDCCH scrambled by the P-RNTI when the PO in each DRX cycle (cycle) is comes. At other occasions or times, the terminal device does not monitor the PDCCH scrambled by the P-RNTI, and a receiver is turned off to achieve the purpose of saving power.

For one terminal device, the position of PF and an index of PO in one paging DRX cycle may be known according to the above formula. As specified in TS 38.304, the PO is composed of multiple PDCCH monitoring occasions, and one PO includes the number of X PDCCH monitoring occasions, where X is equal to the actual sending number of SSBs that are broadcast in a Master Information Block (MIB).

After the terminal device obtains the PF, the index of PO, and the number of PDCCH monitoring occasions in the PO, it only needs to know the starting position of the first PDCCH monitoring occasion in the PO through relevant configuration parameters. The starting position of the first PDCCH monitoring occasion in the PO may be configured through the high-level signaling, or obtained based on the PO index. The terminal device performs blind detection on the paging message according to the determined PO.

In a Release 17 (R17) working item, the 3GPP RAN Plenary agreed to study a project of low-capability NR terminal (RP-193238). Herein, one of the objectives of this project is to study a coverage recovery mechanism of a response to compensate for the loss of coverage performance that may be caused by the reduction of terminal complexity.

In order to resume the performance, an achievable solution is to adopt the repeat transmission mechanism, so that the receiving end may receive and combine multiple transmissions, thereby improving the receiving performance of the receiving end. However, repeat transmission is not supported for the paging PDCCH in NR Rel-15 release. Therefore, for the low-capability NR terminal, how to implement the repeat transmission of the paging PDCCH needs to be specified.

The technical solutions of the embodiments of the present application may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a LTE system, a Frequency Division Duplex (FDD) system, a Time Division Duplex (TDD) system, an Advanced Long Term Evolution (LTE-A) system, an NR system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Worldwide Interoperability for Microwave Access (WiMAX) communications system, a Wireless Local Area Network (WLAN), Wireless Fidelity (WiFi), a next generation of communication system, or other communication systems.

System architecture and service scenarios described in the embodiments of the present application are intended to describe the technical solutions in the embodiments of the present application more clearly, but are not intended to limit the technical solutions provided in the embodiments of the present application. Those of ordinary skill in the art may know that as the network architecture evolves and a new service scenario emerges, the technical solutions provided in the embodiments of the present application are also applicable to a similar technical problem.

The network device involved in the embodiments of the present application may be a common base station (NodeB (NB) or Evolutional Node B (eNB) or gNB), a NR controller, a centralized unit, a NR base station, a remote radio frequency module, a micro base station, a relay, a distributed unit, a Transmission Reception Point (TRP), a Transmission Point (TP) or any other devices. No limits are made to specific technologies and specific device forms adopted by the network device in the embodiments of the present application. In order to facilitate description, in all embodiments of the present application, the above apparatuses providing a wireless communication function for the terminal device are collectively referred to a network device.

In the embodiments of the present application, the terminal device may be any terminal. For example, the terminal device may be user equipment in Machine Type Communication (MTC). That is to say, the terminal device may also be called the UE, a Mobile Station (MS), a mobile terminal, a terminal, etc. The terminal device may communicate with one or more CNs through a RAN. For example, the terminal device may be a mobile terminal (or referred to as a "cellular" phone) and a computer with a mobile terminal. For example, the terminal device may also be a portable device, pocket-sized device, hand-held device, computer built-in device, or in-vehicle mobile apparatus, which exchanges language and/or data with the RAN. No specific limits are made thereto in the embodiments of the present application.

Optionally, the network device and the terminal device may be deployed on land, including indoors or outdoors, and may be held in hands or deployed in vehicles, or may be deployed on water, or may be deployed on an aircraft, a balloon, and an artificial satellite in the air. No limits are made to the present application scenario of the network device and the terminal device in the embodiments of the present application.

Optionally, communication may be performed between the network device and the terminal device and communication between the terminal devices through a licensed spectrum, or through an unlicensed spectrum, or through the licensed spectrum and the unlicensed spectrum simultaneously. Communication may be performed between the network device and the terminal device and communication between the terminal devices through a spectrum below 7 gigahertz (GHz), or through a spectrum above 7 GHz, or through the spectra below 7 GHz and above 7 GHz simultaneously. No limits are made to the spectrum resource used between the network device and the terminal device in the embodiments of the present application.

Generally speaking, traditional communication systems support a limited number of connections and are easy to implement. However, with the development of the communication technology, mobile communication systems will not only support traditional communication, but also support, for example, Device to Device (D2D) communication, Machine to Machine (M2M) communication, MTC, and Vehicle to Vehicle (V2V) communication, etc. The embodiments of the present application may also be applied to these communication systems.

Exemplarily, FIG. 1 shows a communication system 100 applied in the embodiments of the present application. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage. Optionally, the network device 110 may be a Base Transceiver Station (BTS) in the GSM or the CDMA system, or may also be a NB in the WCDMA system, or may further be an eNB or eNodeB in the LTE system or a wireless controller in a Cloud Radio Access Network (CRAN). Or, the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device 120 within the coverage of the network device 110. A "terminal device" used herein includes, but is not limited to, a device arranged to receive/send a communication signal through a wired line connection, for example, through Public Switched Telephone Network (PSTN), Digital Subscriber Line (DSL), digital cable and direct cable connections, and/or another data connection/network) and/ or through a wireless interface, for example, for a cellular network, a WLAN, a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device arranged to communicate through a wireless interface may be called a "wireless communication terminal", a "wireless terminal" or a "mobile terminal." Examples of a mobile terminal include, but are not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform D2D communication.

Optionally, the 5G system or the 5G network may also be called an NR system or an NR network.

FIG. 1 exemplarily shows one network device and two terminal devices.

Optionally, the communication system 100 may include multiple network devices and another number of terminal devices that may be included in coverage of each network device. There are no limits made thereto in the embodiments of the present application.

Optionally, the communication system 100 may further include another network entity such as a network controller and a mobility management entity. There are no limits made thereto in the embodiments of the present application.

It should be understood that a device with a communication function in the network/system in the embodiments of the present application may be called a communication device. Taking the communication system 100 shown in FIG. 1 as an example, the communication device may include the network device 110 and terminal device 120 with the communication function, and the network device 110 and the terminal device 120 may be the specific devices mentioned above and will not be elaborated herein. The communication device may further include other devices in the communication system 100, for example, other network entities like a network controller and a mobility management entity. There are no limits made thereto in the embodiments of the present application.

Figure 2:
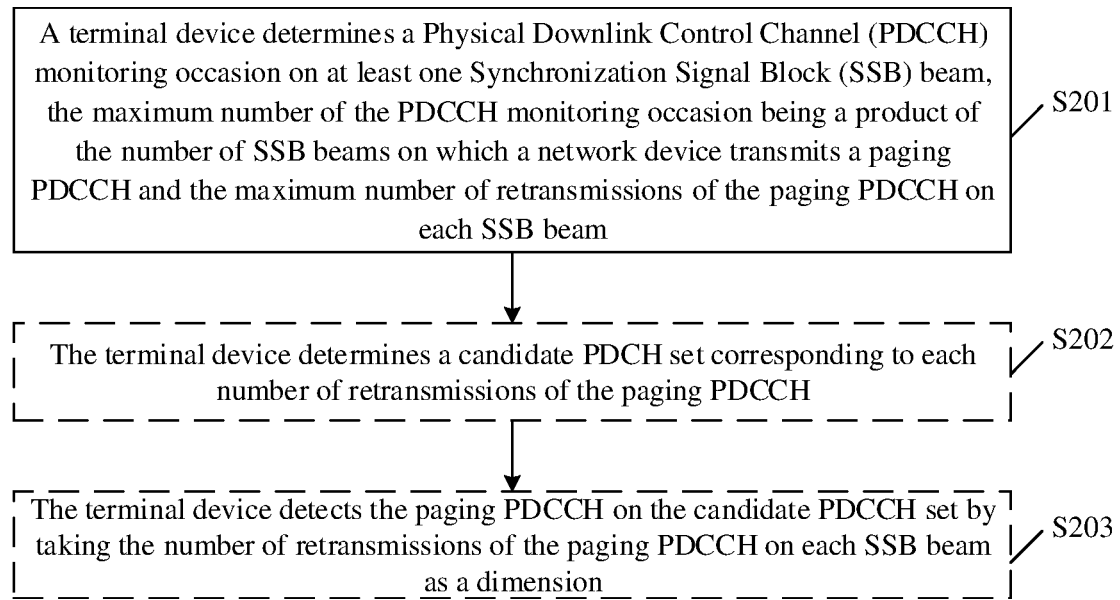
FIG. 2 is a schematic diagram of an optional processing flowchart of a repeat transmission paging method according to an embodiment of the present application.

FIG. 2 shows an optional processing flowchart of a repeat transmission paging method according to an embodiment of the present application. The method includes the following steps S201, S202.

At S201, a terminal device determines a PDCCH monitoring occasion on at least one SSB beam. The maximum number of the PDCCH monitoring occasion is a product of the number of SSB beams on which a network device transmits a paging PDCCH and the maximum number of retransmissions of the paging PDCCH on each SSB beam.

In some embodiments, the terminal device assumes that the network device repeatedly sends the same paging PDCCH on S*Rmax consecutive PDCCH monitoring occasions starting from the first PDCCH-Monitoring Occasion Of PO. That is, the terminal device determines that the maximum number of the PDCCH monitoring occasions is S*Rmax. Herein, Rmax is the maximum number of retransmissions of the paging PDCCH on each SSB beam, and S is the number of SSB beams on which the network device transmits the paging PDDCH.

Herein, the value of Rmax may be configured by the network device. In some embodiments, the network device may also configure a search space of paging for the terminal device; and, the network device may also configure one first PDCCH-Monitoring Occasion Of PO for the terminal device. The first PDCCH-Monitoring Occasion Of PO is configured to indicate the first PDCCH monitoring occasion corresponding to each of POs in one PF.

In some embodiments, the method may further include the following operations.

At S202, the terminal device determines a candidate PDCCH set corresponding to each number of retransmissions of the paging PDCCH.

In some embodiments, each candidate PDCCH in the candidate PDCCH set includes R consecutive PDCCH monitoring occasions for each SSB beam. R is the number of retransmissions of the paging PDCCH on each SSB beam.

For example, if the value of the maximum number of retransmissions Rmax of the paging PDCCH on each SSB beam is 8, the optional values of the number of retransmissions R of the paging PDCCH on each SSB beam are 1, 2, 4, and 8. The candidate PDCCH set corresponding to the paging PDCCH is determined respectively when the value of R is 1, 2, 4 or 8. During specific implementation, for one SSB beam, for example the first SSB beam, Rmax/R candidate PDCCHs are included in Rmax PDCCH monitoring occasions corresponding to the first SSB beam. If R=1 and Rmax=8, 8 candidate PDCCHs are included in 8 PDCCH monitoring occasions corresponding to the first SSB beam, and the 8 candidate PDCCHs form a candidate PDCCH set corresponding to the number of retransmissions of the paging PDCCH being 1. If R=2 and Rmax=8, 4 candidate PDCCHs are included in 8 PDCCH monitoring occasions corresponding to the first SSB beam, and the 4 candidate PDCCHs form a candidate PDCCH set corresponding to the number of retransmissions of the paging PDCCH being 2. If R=4 and Rmax=8, 2 candidate PDCCHs are included in 8 PDCCH monitoring occasions corresponding to the first SSB beam, and the 2 candidate PDCCHs form a candidate PDCCH set corresponding to the number of retransmissions of the paging PDCCH being 4. If R=8 and Rmax=8, one candidate PDCCH is included in 8 PDCCH monitoring occasions corresponding to the first SSB beam, and the 5 candidate PDCCHs form a candidate PDCCH set corresponding to the number of retransmissions of the paging PDCCH being 8.

Herein, the Rmax PDCCH monitoring occasions corresponding to the first SSB beam are sequentially numbered from zero, and then the PDCCH monitoring occasions corresponding to the i-th candidate PDCCH for R retransmissions of the paging PDCCH include: PDCCH monitoring occasions from the number $(i-1)*R$ to the number $i*R-1$. For example, if R=4, the PDCCH monitoring occasions corresponding to the i-th candidate PDCCH in the 4 retransmissions of the paging PDCCH are PDCCH monitoring occasions from the number $(i-1)*4$ to the number $i*4-1$.

In some embodiments, the method may further include the following operations.

At S203, the terminal device detects the paging PDCCH on the candidate PDCCH set according to the number of retransmissions of the paging PDCCH on each SSB beam.

In some embodiments, the terminal device detects the paging PDCCH on all SSB beams. Alternatively, the terminal device detects the paging PDCCH on part of the SSB beams. During specific implementation, the terminal device in a static state may detect the paging PDCCH through blind detection only for part of the SSB beams, thereby achieving the purpose of saving power of the terminal device.

In some embodiments, the terminal device performs paging PDCCH respectively on the candidate PDCCH sets corresponding to different numbers of retransmissions that are determined in S203. For example, if the maximum number of retransmissions is 8, then the candidate PDCCH sets corresponding to the number of retransmissions being 1, 2, 4, and 8 can be determined respectively in S203. The terminal device may perform blind detection of paging PDCCH on the candidate PDCCH sets in an ascending order of the number of retransmissions. That is, paging PDCCH blind detection is firstly performed on the candidate PDCCH set whose number of retransmissions is 1, then blind detection of paging PDCCH is performed on the candidate PDCCH set whose number of retransmissions is 2, then blind detection of paging PDCCH is performed on the candidate PDCCH set whose number of retransmissions is 4, and finally, blind detection of paging PDCCH is performed on the candidate PDCCH set whose number of retransmissions is 8. The terminal device may also perform blind detection of paging PDCCH on the candidate PDCCH sets in a descending order of the number of retransmissions. That is, blind detection of paging PDCCH is firstly performed on the candidate PDCCH set whose number of retransmissions is 8, then blind detection of paging PDCCH is performed on the candidate PDCCH set whose number of retransmissions is 4, then blind detection of paging PDCCH is performed on the candidate PDCCH set whose number of retransmissions is 2, and finally, blind detection of paging PDCCH is performed on the candidate PDCCH set whose number of retransmissions is 1. The terminal device may also perform blind detection of paging PDCCH on the candidate PDCCH sets corresponding to different numbers of retransmissions in any order.

In some embodiments, the terminal device may determine a retransmission manner adopted by the network device to retransmit the paging PDCCH according to a protocol or according to the configuration of the network device, so that the terminal device performs blind detection on the paging PDCCH according to the retransmission manner of the paging PDCCH.

During specific implementation, the retransmission manner of the paging PDCCH may include that: for the maximum number of PDCCH monitoring occasion, starting from the first PDCCH monitoring occasion and taking S consecutive PDCCH monitoring occasions as a group, the first group of PDCCH monitoring occasions corresponds to the first retransmission of the paging PDCCH on the S SSB beams, the second group of PDCCH monitoring occasions corresponds to the second retransmission of the paging PDCCH on the S SSB beams, and so on, and the Rmax-th group of PDCCH monitoring occasion corresponds to the Rmax-th retransmission on the S SSB beams. In such retransmission manner, firstly the first group of S PDCCH monitoring occasions is used to perform a retransmission on each SSB beam of all SSB beams, then the second group of S PDCCH monitoring occasions after the first group of S PDCCH monitoring occasions is used to perform a retransmission on each SSB beam of all SSB beams, and so on.

Alternatively, the retransmission manner of the paging PDCCH may further include that: for the maximum number of PDCCH monitoring occasion, starting from the first PDCCH monitoring occasion and taking Rmax consecutive PDCCH monitoring occasions as a group, the first group of PDCCH monitoring occasions corresponds to the number of Rmax retransmissions of the paging PDCCH on the first SSB beam, the second group of PDCCH monitoring occasions corresponds to the Rmax retransmissions of the paging PDCCH on the second SSB beam, and so on, and the S-th group of PDCCH monitoring occasions corresponds to the Rmax retransmissions on the S-th SSB beam. In such retransmission manner, a polling manner of SSB beams is adopted, firstly, the paging PDCCH is retransmitted Rmax times for one SSB beam, then the paging PDCCH is retransmitted Rmax times for another SSB beam, and so on.

Figure 3:
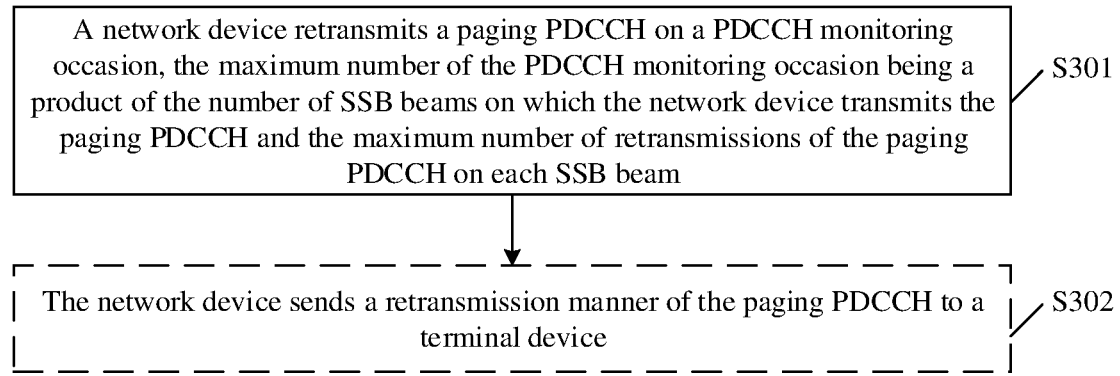
FIG. 3 is a schematic diagram of another optional processing flowchart of a repeat transmission paging method according to an embodiment of the present application.

FIG. 3 shows another optional processing flowchart of a repeat transmission paging method according to an embodiment of the present application. The method includes the following steps S301.

At S301, a network device retransmits a paging PDCCH on a PDCCH monitoring occasion. The maximum number of the PDCCH monitoring occasion is a product of the number of SSB beams on which the network device transmits the paging PDCCH and the maximum number of retransmissions of the paging PDCCH on each SSB beam.

In some embodiments, the retransmission manner that the network device retransmits the paging PDCCH on the PDCCH monitoring occasion may be that: for the maximum number of the PDCCH monitoring occasions, starting from the first PDCCH monitoring occasion and taking S consecutive PDCCH monitoring occasions as a group, the network device retransmits the paging PDCCH on S SSB beams sequentially based on the first group of PDCCH monitoring occasions, the second group of PDCCH monitoring occasions, and until the Rmax-th group of PDCCH monitoring occasions. Herein, Rmax is the maximum number of retransmissions of the paging PDCCH on each SSB beam, and S is the number of SSB beams on which the network device transmits the paging PDCCH.

In some other embodiments, the retransmission manner that the network device retransmits the paging PDCCH on the PDCCH monitoring occasion may also be that: for the maximum number of the PDCCH monitoring occasion, starting from the first PDCCH monitoring occasion and taking Rmax consecutive PDCCH monitoring occasions as a group, the network device retransmits the paging PDCCH Rmax times on the first SSB beam based on the first group of PDCCH monitoring occasions, retransmits the paging PDCCH Rmax times on the second SSB beam based on the second group of PDCCH monitoring occasions, and so on, and retransmits the paging PDCCH Rmax times on the S-th SSB beam based on the S-th group of PDCCH monitoring occasions. Herein, Rmax is the maximum number of retransmissions of the paging PDCCH on each SSB beam, and S is the number of SSB beams on which the network device transmits the paging PDCCH.

In some embodiments, the method may further include the following operations.

At S302, the network device sends a retransmission manner of the paging PDCCH to a terminal device.

The network device sends the retransmission manner of the paging PDCCH to the terminal device, so that the terminal device may perform blind detection on the paging PDCCH according to the retransmission manner of the paging PDCCH.

The processing procedure of the repeat transmission paging method provided by the embodiments of the present application will be described in detail below for different retransmission manners of the paging PDCCH respectively.

Figure 4:
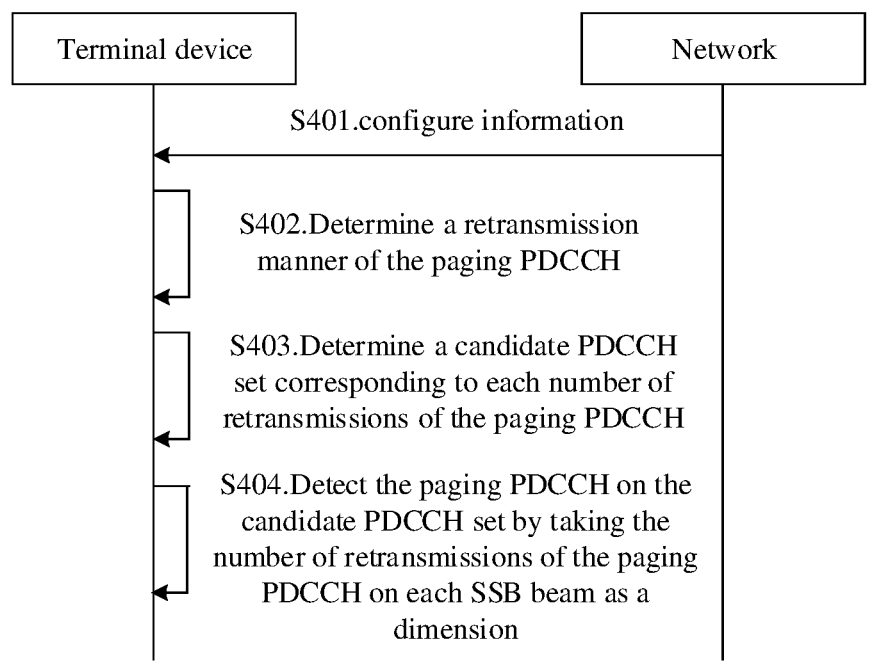
FIG. 4 is a schematic diagram of a detailed processing flowchart of a repeat transmission paging method according to an embodiment of the present application.

FIG. 4 shows a schematic diagram of an optional detailed processing flowchart of a repeat transmission paging method according to an embodiment of the present application. The method includes the following steps S401, S402, S403.

At S401, a network device sends configuration information to a terminal device.

In some embodiments, the configuration information may be used to configure related information of a paging search space, and the configuration information may include as follows.

A) Configuration of one paging search space.
B) Configuration of a first PDCCH-Monitoring Occasion Of PO, the first PDCCH-Monitoring Occasion Of PO being configured to indicate the first PDCCH monitoring occasion corresponding to each of POs in one PF.
C) The maximum number of retransmission Rmax of the paging PDCCH on each SSB beam.

At S402, the terminal device determines a retransmission manner of the paging PDCCH.

In some embodiments, the terminal device assumes that the network device retransmits the paging PDCCH using consecutive S*Rmax PDCCH monitoring occasions starting from each first PDCCH-Monitoring Occasion Of PO. The retransmission manner of the paging PDCCH may be that: the network device adopts a manner of SSB beam polling first and then retransmission, that is, starting from each first PDCCH-Monitoring Occasion Of PO and starting from the first PDCCH monitoring occasion, every S consecutive PDCCH monitoring occasions are divided into a group, the first group of S consecutive PDCCH monitoring occasions corresponds to the first retransmission of the paging PDCCH on the S SSB beams, the second group of S consecutive PDCCH monitoring occasions corresponds to the second retransmission of the paging PDCCH on the S SSB beams, and the n-th group of S consecutive PDCCH monitoring occasions corresponds to the n-th retransmission of the paging PDCCH on the S SSB beams, until the Rmax-th group of S consecutive PDCCH monitoring occasion corresponds to the Rmax-th retransmission on the S SSB beams. Herein, Rmax is the maximum number of retransmissions of the paging PDCCH on each SSB beam, and S is the number of SSB beams on which the network device transmits the paging PDCCH.

Figure 5:
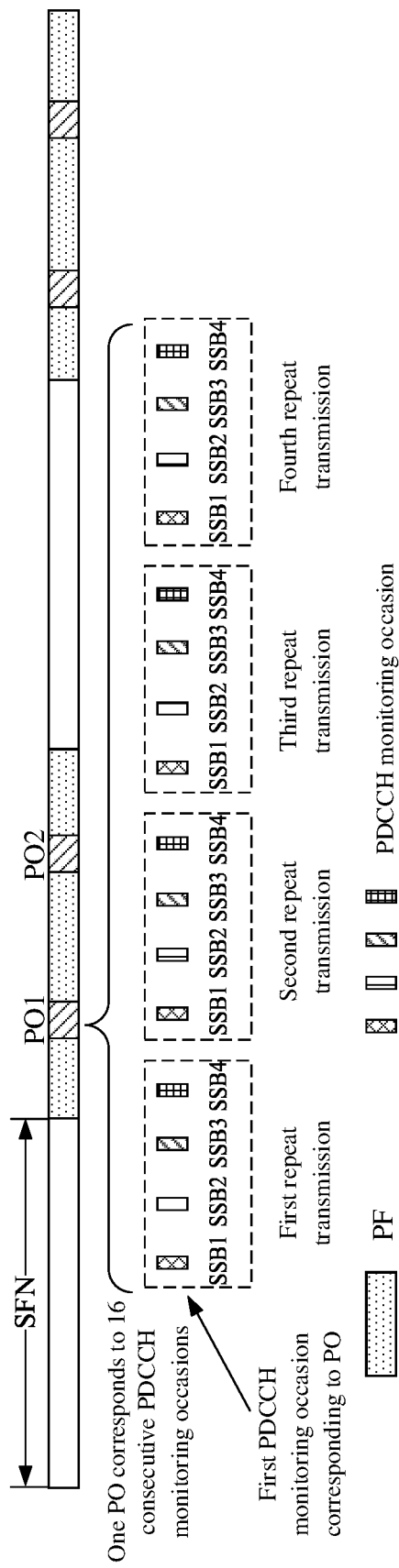
FIG. 5 is a schematic diagram of an optional retransmission manner of a paging PDCCH according to an embodiment of the present application.

Taking Rmax=4 and S=4 as an example, one PO corresponds to 16 consecutive PDCCH monitoring occasions. FIG. 5 shows an optional retransmission manner of the paging PDCCH. According to the number S of SSB beams on which the network device transmits the paging PDCCH, starting from the first PDCCH monitoring occasion, 4 consecutive PDCCH monitoring occasions are divided into one group, and then 16 PDCCH monitoring occasions may be divided into 4 groups. The paging PDCCH is transmitted on the SSB1 beam using the first group of PDCCH monitoring occasions, the paging PDCCH is transmitted on the SSB2 beam using the second group of PDCCH monitoring occasions, the paging PDCCH is transmitted on the SSB3 beam using the third group of PDCCH monitoring occasions, and the paging PDCCH is transmitted on the SSB4 beam using the fourth group of PDCCH monitoring occasions.

At S403, the terminal device determines a candidate PDCCH set corresponding to each number of retransmissions of the paging PDCCH.

In some embodiments, each candidate PDCCH in the candidate PDCCH set includes R consecutive PDCCH monitoring occasions for each SSB beam. R is the number of retransmissions of the paging PDCCH on each SSB beam.

Figure 6:
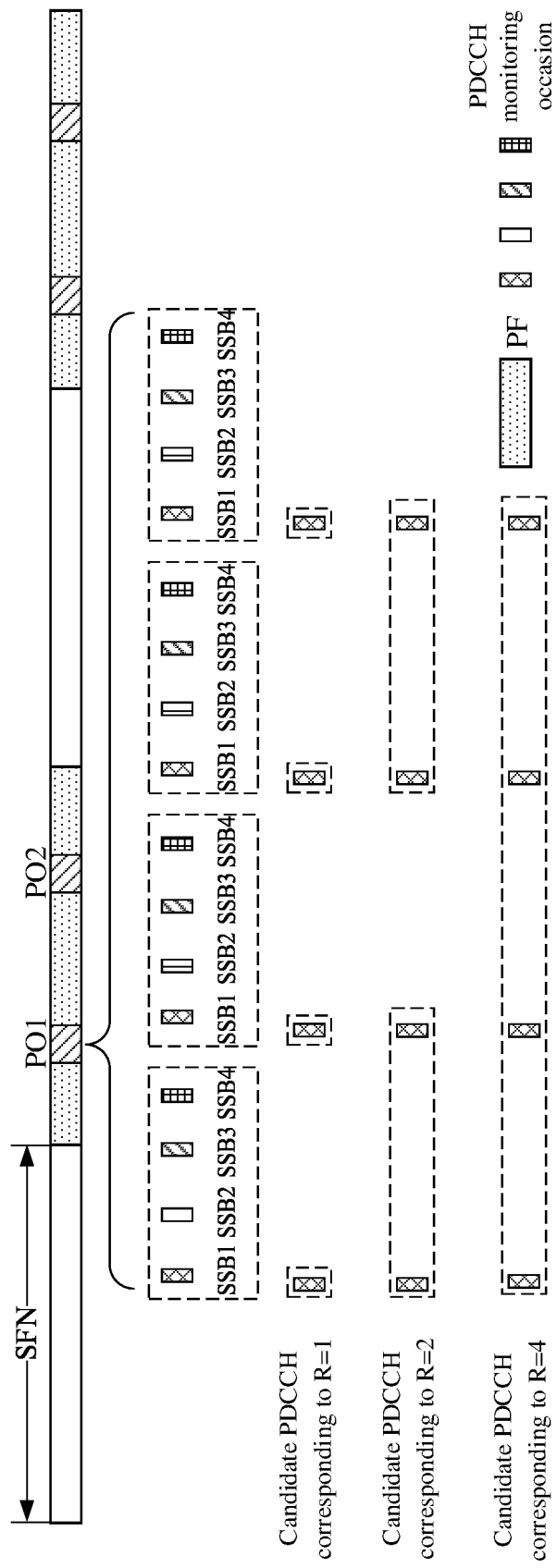
FIG. 6 is an optional schematic diagram of a candidate PDCCH according to an embodiment of the present application.

Taking the maximum number of retransmissions of the paging PDCCH on each SSB beam Rmax=4 as an example, the optional values of the number of retransmissions R of the paging PDCCH on each SSB beam are 1, 2 and 4. The candidate PDCCH sets corresponding to the paging PDCCH are determined respectively when the value of R is 1, 2 or 4. During specific implementation, FIG. 6 shows an optional schematic diagram of the candidate PDCCH. For SSB1 beam, Rmax/R candidate PDCCHs are included in Rmax PDCCH monitoring occasions corresponding to the first SSB beam. If R=1 and Rmax=4, 4 candidate PDCCHs are included in the 4 PDCCH monitoring occasions corresponding to the first SSB beam, and the 4 candidate PDCCHs form a candidate PDCCH set corresponding to the number of retransmissions of the paging PDCCH being 1. If R=2 and Rmax=4, 2 candidate PDCCHs are included in the 4 PDCCH monitoring occasions corresponding to the first SSB beam, and the 2 candidate PDCCHs form a candidate PDCCH set corresponding to the number of retransmissions of the paging PDCCH being 2. If R=4 and Rmax=4, one candidate PDCCH is included in the 4 PDCCH monitoring occasions corresponding to the first SSB beam, and the candidate PDCCH forms a candidate PDCCH set corresponding to the number of retransmissions of the paging PDCCH being 4.

Herein, the Rmax PDCCH monitoring occasions corresponding to the first SSB beam are sequentially numbered from zero, and the PDCCH monitoring occasions corresponding to the i-th candidate PDCCH for R retransmissions of the paging PDCCH include: PDCCH monitoring occasions from the number (i−1)*R to the number i*R−1. For example, if R=4, the PDCCH monitoring occasions corresponding to the i-th candidate PDCCH in the 4 retransmissions of the paging PDCCH are PDCCH monitoring occasions from the number (i−1)*4 to the number i*4−1.

At S404, the terminal device detects the paging PDCCH on the candidate PDCCH set according to the number of retransmissions of the paging PDCCH on each SSB beam.

In some embodiments, the terminal device detects the paging PDCCH on all SSB beams. Alternatively, the terminal device detects the paging PDCCH on part of the SSB beams of all the SSB beams. During specific implementation, the terminal device in a static state may detect the paging PDCCH through blind detection only for part of the SSB beams, thereby achieving the purpose of saving power of the terminal device.

In some embodiments, the terminal device performs blind detection of paging PDCCH respectively on the candidate PDCCH sets corresponding to different numbers of retransmissions that are determined in S403. For example, the maximum number of retransmissions is 4, then the candidate PDCCH sets corresponding to the number of retransmissions being 1, 2 and 4 can be determined respectively in S403. The terminal device may perform blind detection of paging PDCCH on the candidate PDCCH sets in an ascending order of the number of retransmissions. That is, blind detection of paging PDCCH is firstly performed on the candidate PDCCH set whose number of retransmissions is 1, then blind detection of paging PDCCH is performed on the candidate PDCCH set whose number of retransmissions is 2, and blind detection of paging PDCCH is performed on the candidate PDCCH set whose number of retransmissions is 4. The terminal device may also perform blind detection of paging PDCCH on the candidate PDCCH sets in a descending order of the number of retransmissions. That is, blind detection of paging PDCCH is firstly performed on the candidate PDCCH set whose number of retransmissions is 4, then blind detection of paging PDCCH is performed on the candidate PDCCH set whose number of retransmissions is 2, and finally, blind detection of paging PDCCH is performed on the candidate PDCCH set whose number of retransmissions is 1. The terminal device may also perform blind detection of paging PDCCH on the candidate PDCCH sets corresponding to different numbers of retransmissions in any order.

In some embodiments, the terminal device may determine a retransmission manner adopted by the network device to retransmit the paging PDCCH according to a protocol or according to the configuration of the network device, so that the terminal device performs blind detection on the paging PDCCH according to the retransmission manner of the paging PDCCH.

A schematic diagram of an optional detailed processing flowchart of a repeat transmission paging method according to an embodiment of the present application includes the following steps.

First, a network device sends configuration information to a terminal device.

In some embodiments, the configuration information may be used to configure related information of a paging search space, and the configuration information may include as follows.

A) Configuration of one paging search space.
B) Configuration of a first PDCCH-Monitoring Occasion Of PO, the first PDCCH-Monitoring Occasion Of PO being configured to indicate the first PDCCH monitoring occasion corresponding to each of POs in one PF.
C) The maximum number of retransmission Rmax of the paging PDCCH on each SSB beam.

Second, the terminal device determines a retransmission manner of the paging PDCCH.

In some embodiments, the terminal device assumes that the network device retransmits the paging PDCCH using consecutive S*Rmax PDCCH monitoring occasions starting from each first PDCCH-Monitoring Occasion Of PO. The retransmission manner of the paging PDCCH may be that: after retransmitting the paging PDCCH Rmax times using one SSB beam, the network device traverses other SSB beams for polling. That is, starting from each first PDCCH-Monitoring Occasion Of PO, every Rmax consecutive PDCCH monitoring occasions are divided into one group, the first group of Rmax PDDCH monitoring occasions corresponds to the Rmax transmissions on the first SSB beam, and the S-th group of Rmax PDDCH monitoring occasions corresponds to the Rmax transmissions on the S-th SSB beam. Herein, Rmax is the maximum number of retransmissions of the paging PDCCH on each SSB beam, and S is the number of SSB beams on which the network device transmits the paging PDCCH.

Figure 7:
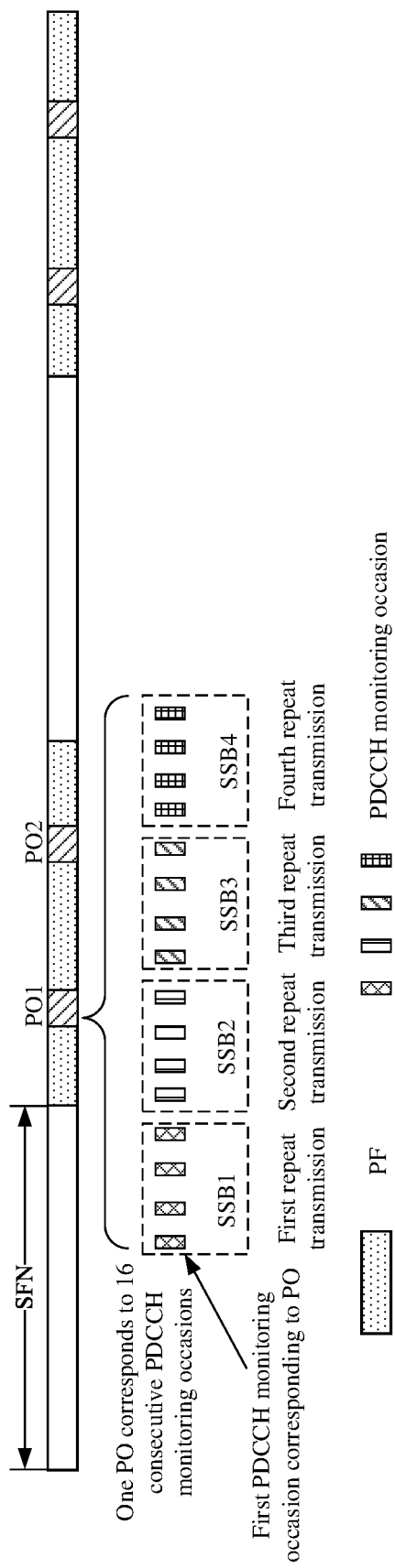
FIG. 7 is a schematic diagram of another optional retransmission manner of a paging PDCCH according to an embodiment of the present application.

Taking Rmax=4 and S=4 as an example, one PO corresponds to 16 consecutive PDCCH monitoring occasions, FIG. 7 shoes another optional retransmission manner of the paging PDCCH. According to the value of Rmax, starting from the first PDCCH monitoring occasion, four consecutive PDCCH monitoring occasions are divided into one group, and S groups of PDCCH monitoring occasions in total. The first group of PDCCH monitoring occasions is transmitted on the SSB1 beam four times, the second group of PDCCH monitoring occasions is transmitted on the SSB2 beam four times, the third group of PDCCH monitoring occasions is transmitted on the SSB3 beam four times, and the fourth group of PDCCH monitoring occasions is transmitted on the SSB4 beam four times.

Third, the terminal device determines a candidate PDCCH set corresponding to each number of retransmissions of the paging PDCCH.

In some embodiments, each candidate PDCCH in the candidate PDCCH set includes R consecutive PDCCH monitoring occasions for each SSB beam. R is the number of retransmissions of the paging PDCCH on each SSB beam.

Figure 8:
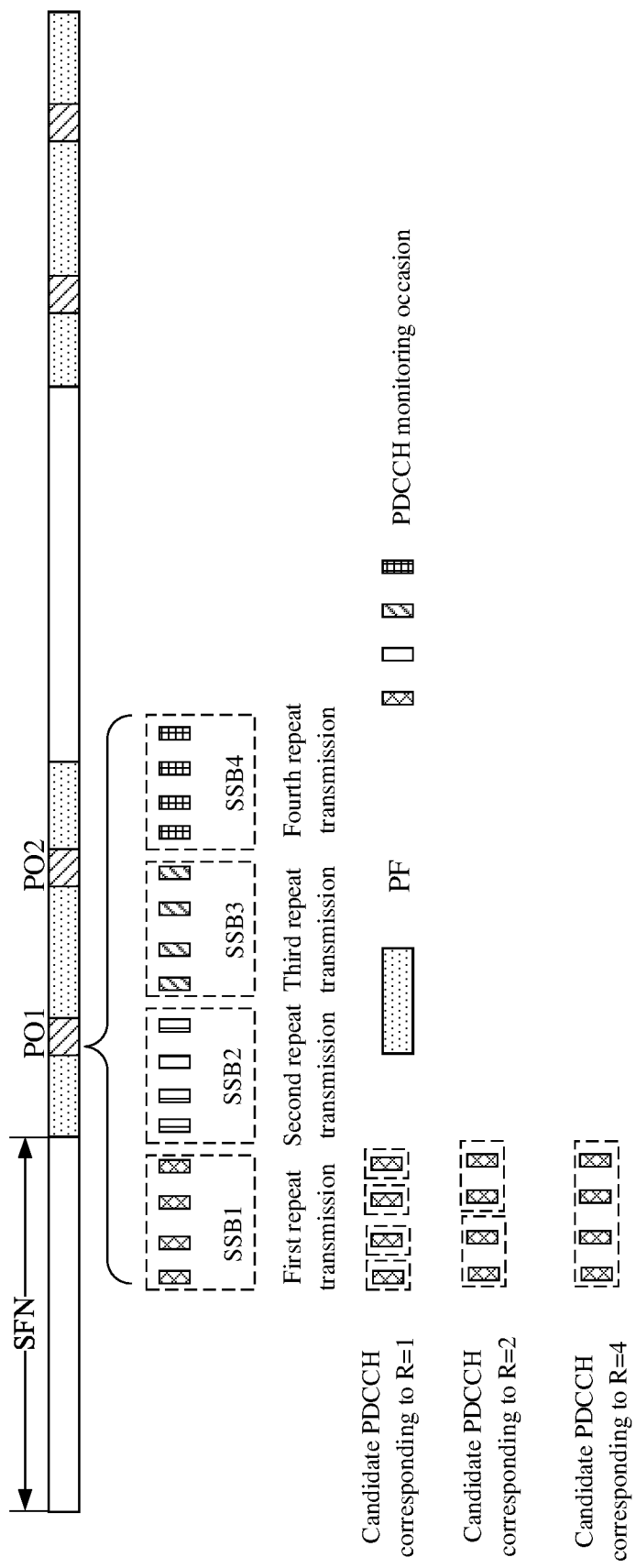
FIG. 8 is another optional schematic diagram of a candidate PDCCH according to an embodiment of the present application.

Taking the maximum number of retransmissions of the paging PDCCH on each SSB beam Rmax=4 as an example, the optional values of the number of retransmissions R of the paging PDCCH on each SSB beam are 1, 2 and 4. The candidate PDCCH set corresponding to the paging PDCCH is determined respectively when the value of R is 1, 2 or 4. During specific implementation, FIG. 8 shows another optional schematic diagram of the candidate PDCCH. For the SSB1 beam, Rmax/R candidate PDCCHs are included in Rmax PDCCH monitoring occasions corresponding to the first SSB beam. If R=1 and Rmax=4, 4 candidate PDCCHs are included in the 4 PDCCH monitoring occasions corresponding to the first SSB beam, and the 4 candidate PDCCHs form a candidate PDCCH set corresponding to the number of retransmissions of the paging PDCCH being 1. If R=2 and Rmax=4, 2 candidate PDCCHs are included in the 4 PDCCH monitoring occasions corresponding to the first SSB beam, and the 2 candidate PDCCHs form a candidate PDCCH set corresponding to the number of retransmissions of the paging PDCCH being 2. If R=4 and Rmax=4, one candidate PDCCH is included in the 4 PDCCH monitoring occasions corresponding to the first SSB beam, and the candidate PDCCHs forms a candidate PDCCH set corresponding to the number of retransmissions of the paging PDCCH being 4.

Herein, the Rmax PDCCH monitoring occasions corresponding to the first SSB beam are sequentially numbered from zero, and the PDCCH monitoring occasions corresponding to the i-th candidate PDCCH for R retransmissions of the paging PDCCH include: PDCCH monitoring occasions from the number $(i-1)*R$ to the number $i*R-1$. For example, if R=4, the PDCCH monitoring occasions corresponding to the i-th candidate PDCCH in the 4 retransmissions of the paging PDCCH are PDCCH monitoring occasions from the number $(i-1)*4$ to the number $i*4-1$.

Fourth, the terminal device detects the paging PDCCH on the candidate PDCCH set according to the number of retransmissions of the paging PDCCH on each SSB beam.

In some embodiments, the terminal device detects the paging PDCCH on all SSB beams. Alternatively, the terminal device detects the paging PDCCH on part of the SSB beams. During specific implementation, the terminal device in a static state may detect the paging PDCCH through blind detection only for part of the SSB beams, thereby achieving the purpose of saving power of the terminal device.

In some embodiments, the terminal device performs blind detection of paging PDCCH respectively on the candidate PDCCH sets corresponding to different numbers of retransmissions that are determined in S403. For example, the maximum number of retransmissions is 4, then the candidate PDCCH set corresponding to the number of retransmissions being 1, 2 and 4 can be determined respectively in S403. The terminal device may perform blind detection of paging PDCCH on the candidate PDCCH set in an ascending order of the number of retransmissions. That is, blind detection of paging PDCCH is firstly performed on the candidate PDCCH set whose number of retransmissions is 1, then blind detection of paging PDCCH is performed on the candidate PDCCH set whose number of retransmissions is 2, and blind detection of paging PDCCH is performed on the candidate PDCCH set whose number of retransmissions is 4. The terminal device may also perform blind detection of paging PDCCH on the candidate PDCCH set in a descending order of the number of retransmissions. That is, blind detection of paging PDCCH is firstly performed on the candidate PDCCH set whose number of retransmissions is 4, then blind detection of paging PDCCH is performed on the candidate PDCCH set whose number of retransmissions is 2, and finally, blind detection of paging PDCCH is performed on the candidate PDCCH set whose number of retransmissions is 1. The terminal device may also perform blind detection of paging PDCCH on the candidate PDCCH sets corresponding to different numbers of retransmissions in any order.

In some embodiments, the terminal device may determine a retransmission manner adopted by the network device to retransmit the paging PDCCH according to a protocol or according to the configuration of the network device, so that the terminal device performs blind detection on the paging PDCCH according to the retransmission manner of the paging PDCCH.

Figure 9:
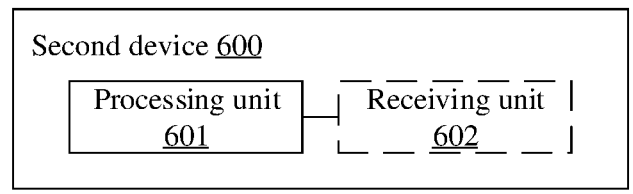
FIG. 9 is a schematic diagram of an optional composition structure of a terminal device according to an embodiment of the present application.

In order to implement the repeat transmission paging method provided by the embodiments of the present application, the embodiments of the present application further provide a terminal device. FIG. 9 shows an optional composition structure of the terminal device 600, which includes: a processing unit 600.

The processing unit 601 is configured to determine a PDCCH monitoring occasion on at least one SSB beam, the maximum number of the PDCCH monitoring occasion being a product of the number of SSB beams on which a network device transmits a paging PDCCH and the maximum number of retransmissions of the paging PDCCH on each SSB beam.

In some embodiments, the processing unit 601 is further configured to determine a candidate PDCCH set corresponding to each number of retransmissions of the paging PDCCH.

Each candidate PDCCH in the candidate PDCCH set includes R consecutive PDCCH monitoring occasions for each SSB beam. R is the number of retransmissions of the paging PDCCH on each SSB beam.

In some embodiments, for the first SSB beam, Rmax/R candidate PDCCHs are included in Rmax PDCCH monitoring occasions corresponding to the first SSB beam. Rmax is the maximum number of retransmissions of the paging PDCCH on each SSB beam.

In some embodiments, the Rmax PDCCH monitoring occasions corresponding to the first SSB beam are sequentially numbered from zero, and the PDCCH monitoring occasions corresponding to the i-th candidate PDCCH for R retransmissions of the paging PDCCH include: PDCCH monitoring occasions from the number (i−1)*R to the number i*R−1.

In some embodiments, the terminal device 600 further includes: a receiving unit 602.

The receiving unit 602 is configured to detect the paging PDCCH on the candidate PDCCH set according to the number of retransmissions of the paging PDCCH on each SSB beam.

In some embodiments, the receiving unit 602 is configured to detect the paging PDCCH on all SSB beams. Alternatively, the receiving unit 602 is configured to detect the paging PDCCH on part of the SSB beams.

In some embodiments, the retransmission manner of the paging PDCCH is predetermined by a protocol. Alternatively, the retransmission manner of the paging PDCCH is configured by the network device.

In some embodiments, the retransmission manner of the paging PDCCH includes that: for the maximum number of PDCCH monitoring occasion, starting from the first PDCCH monitoring occasion and taking S consecutive PDCCH monitoring occasions as a group, the first group of PDCCH monitoring occasions corresponds to the first retransmission of the paging PDCCH on the S SSB beams, the second group of PDCCH monitoring occasions corresponds to the second retransmission of the paging PDCCH on the S SSB beams, and so on, and the Rmax-th group of PDCCH monitoring occasion corresponds to the Rmax-th retransmission on the S SSB beams. Herein, Rmax is the maximum number of retransmissions of the paging PDCCH on each SSB beam, and S is the number of SSB beams on which the network device transmits the paging PDCCH.

The retransmission manner of the paging PDCCH includes that: for the maximum number of the PDCCH monitoring occasion, starting from the first PDCCH monitoring occasion and taking Rmax consecutive PDCCH monitoring occasions as a group, the first group of PDCCH monitoring occasions corresponds to Rmax retransmissions of the paging PDCCH on the first SSB beam, the second group of PDCCH monitoring occasions corresponds to the Rmax retransmissions of the paging PDCCH on the second SSB beam, and so on, and the S-th group of PDCCH monitoring occasions corresponds to the Rmax-th retransmissions on the S-th SSB beam. Herein, Rmax is the maximum number of retransmissions of the paging PDCCH on each SSB beam, and S is the number of SSB beams on which the network device transmits the paging PDCCH.

It should be understood that, in various embodiments of the present application, a magnitude of a sequence number of each process does not mean an execution sequence and the execution sequence of each process should be determined by its function and an internal logic and should not form any limit to an implementation process of the embodiments of the present application.

Figure 10:
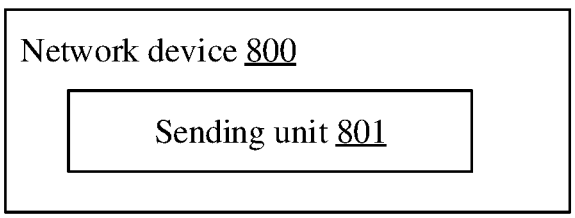
FIG. 10 is a schematic diagram of an optional composition structure of a network device according to an embodiment of the present application.

In order to implement the repeat transmission paging method provided by the embodiments of the present application, the embodiments of the present application further provide a network device. FIG. 10 shows an optional composition structure of the network device 800, which includes: a sending unit 801.

The sending unit 801 is configured to retransmit a paging PDCCH on a PDCCH monitoring occasion, the maximum number of the PDCCH monitoring occasion being a product of the number of SSB beams on which the network device transmits the paging PDCCH and the maximum number of retransmissions of the paging PDCCH on each SSB beam.

In some embodiments, the sending unit 801 is configured to: for the maximum number of the PDCCH monitoring occasion, starting from the first PDCCH monitoring occasion and taking S consecutive PDCCH monitoring occasions as a group, retransmit the paging PDCCH on S SSB beams sequentially based on the first group of PDCCH monitoring occasions, the second group of PDCCH monitoring occasions, and until the Rmax-th group of PDCCH monitoring occasions.

Herein, Rmax is the maximum number of retransmissions of the paging PDCCH on each SSB beam, and S is the number of SSB beams on which the network device transmits the paging PDCCH.

In some embodiments, the sending unit 801 is configured to: for the maximum number of the PDCCH monitoring occasion, starting from the first PDCCH monitoring occasion and taking Rmax consecutive PDCCH monitoring occasions as a group, retransmit the paging PDCCH Rmax times on the first SSB beam based on the first group of PDCCH monitoring occasions, retransmit the paging PDCCH Rmax times on the second SSB beam based on the second group of PDCCH monitoring occasions, and so on, and retransmit the paging PDCCH Rmax times on the S-th SSB beam based on the S-th group of PDCCH monitoring occasions.

Herein, S is the number of SSB beams on which the network device transmits the paging PDCCH, and Rmax is the maximum number of retransmissions of the paging PDCCH on each SSB beam.

In some embodiments, the sending unit 801 is further configured to send the retransmission manner of the paging PDCCH to the terminal device.

The embodiments of the present application further provide a terminal device, which includes: a processor, and a memory configured to store a computer program capable of running on the processor. Herein, the processor is configured to perform the steps of the repeat transmission paging method executed by the terminal device as described above.

The embodiments of the present application further provide a network device, which includes: a processor, and a memory configured to store a computer program capable of running on the processor. Herein, the processor is configured to perform the steps of the repeat transmission paging method executed by the network device as described above.

The embodiments of the present application further provide a chip, which includes: a processor, configured to call from a memory and run a computer program to enable a device installed with the chip to perform the repeat transmission paging method executed by the terminal device as described above.

The embodiments of the present application provide a chip, which includes: a processor, configured to call from a memory and run a computer program to enable a device installed with the chip to perform the repeat transmission paging method executed by the network device as described above.

The embodiments of the present application further provide a storage medium, storing an executable program. The executable program, when executed by a processor, implements the repeat transmission paging method executed by the terminal device as described above.

The embodiments of the present application further provide a storage medium, storing an executable program. The executable program, when executed by a processor, implements the repeat transmission paging method executed by the network device as described above.

The embodiments of the present application further provide a computer program product, which includes: a computer program instruction. The computer program instruction enables a computer to perform the repeat transmission paging method executed by the terminal device as described above.

The embodiments of the present application further provide a computer program product, which includes: a computer program instruction. The computer program instruction enables a computer to perform the repeat transmission paging method executed by the network device as described above.

The embodiments of the present application further provide a computer program, enabling a computer to perform the repeat transmission paging method executed by the terminal device as described above.

The embodiments of the present application further provide a computer program, enabling a computer to perform the repeat transmission paging method executed by the network device as described above.

Figure 11:
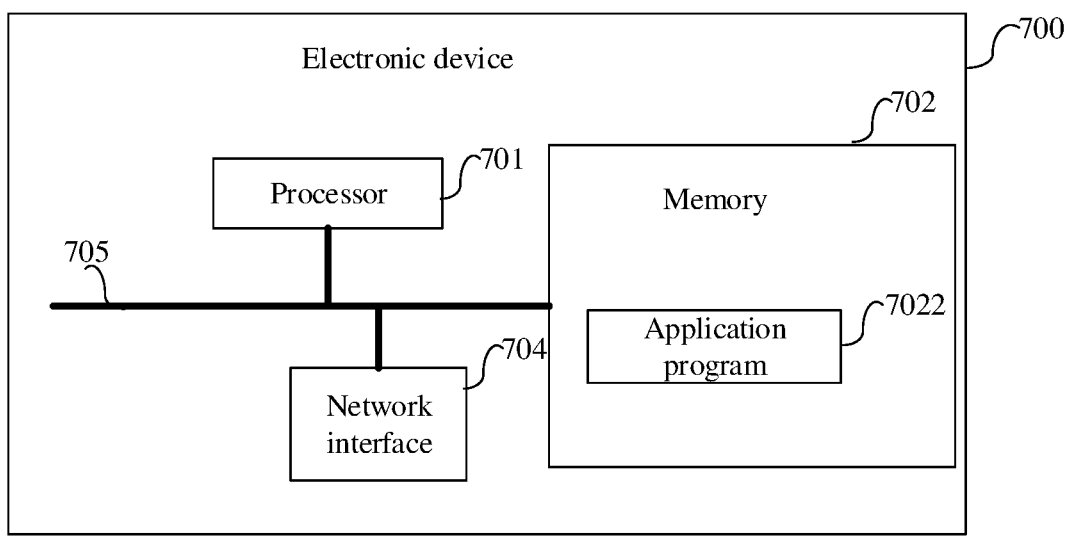
FIG. 11 is a schematic diagram of a hardware composition structure of an electronic device according to an embodiment of the present application.

FIG. 11 is a schematic diagram of a hardware composition structure of an electronic device (e.g., a terminal device or a network device) according to an embodiment of the present application. The terminal device 700 includes: at least one processor 701, a memory 702, and at least one network interface 704. Various components of the terminal device 700 are coupled together through a bus system 705. It should be understood that the bus system 705 is configured to implement connection and communication between these components. In addition to a data bus, the bus system 705 further includes a power bus, a control bus, and a status signal bus. However, for clarity of description, various buses are marked as the bus system 705 in FIG. 11.

It should be understood that the memory 702 may be a volatile memory or a non-volatile memory, or may include both a volatile memory and a non-volatile memory. Herein, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disk or a Compact Disc Read-Only Memory (CD-ROM); and the magnetic surface memory may be a magnetic disk memory or a magnetic tape memory. The volatile memory may be a RAM that acts as an external cache. By way of example and not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiment of the present application is intended to include, but is not limited to, these memories and any other suitable types of memories.

The memory 702 in the embodiment of the present application is configured to store various types of data to support operations of the electronic device 700. Examples of such data include: any computer application operated on the electronic device 700, such as an application program 7022. A program for implementing the method in the embodiments of the present application may be included in the application program 7022.

The method disclosed in the above embodiments of the present application may be applied to the processor 701, or may be implemented by the processor 701. The processor 701 may be an integrated circuit chip with signal processing capability. During implementation, the steps of the above method may be completed by hardware integrated logic circuits in the processor 701 or instructions in the form of software. The above processor 701 may be a general-purpose processor, a Digital Signal Processor (DSP), or other programmable logic devices, discrete gate or transistor logic devices, discrete hardware components, or the like. The processor 701 may implement or perform various methods, steps, and logical block diagrams disclosed in the embodiments of the present application. The general-purpose processor may be a microprocessor, or any conventional processor. Steps of the methods disclosed with reference to the embodiments of the present application may be directly performed and accomplished by a hardware decoding processor, or may be performed and accomplished by a combination of hardware and software modules in the decoding processor. The software modules may be located in a storage medium. The storage medium is located in the memory 702, and the processor 701 reads information in the memory 702 and completes the steps of the above method in combination with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic elements for executing the above methods.

In the repeat transmission paging method, the electronic device, and the storage medium provided by the embodiments of the present application, the method includes that: a terminal device determines a PDCCH monitoring occasion on at least one SSB beam. The maximum number of the PDCCH monitoring occasion is the product of the number of SSB beams on which a network device transmits the paging PDCCH and the maximum number of retransmissions of the paging PDCCH on each SSB beam. In this way, the terminal device may specify the repeat transmission process of the paging PDCCH.

The present application is described with reference to flowcharts and/or block diagrams of the method, the device (system) and the computer program product according to the embodiments of the present application. It should be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

It should be understood that the terms "system" and "network" in the present application are often used interchangeably herein. The term "and/or" in the present application describes only an association relationship for describing associated objects and represents that three relationships may exist. For example, A and/or B may represent the following three cases: Only A exists, both A and B exist, and only B exists. In addition, the character "/" in the present application generally indicates an "or" relationship between the associated objects.

The description above is only the preferred embodiments of the present application and is not intended to limit the protection scope of the present application. Any modifications, equivalent replacements, improvements and the like made within the spirit and principle of the present application shall fall within the protection scope of the present application.

The invention claimed is:

1. A repeat transmission paging method, the method comprising:
   determining, by a terminal device, a Physical Downlink Control Channel (PDCCH) monitoring occasion on at least one Synchronization Signal Block (SSB) beam, wherein a maximum number of the PDCCH monitoring occasion is a product of a number of SSB beams on which a network device transmits a paging PDCCH and a maximum number of retransmissions of the paging PDCCH on each SSB beam,
   wherein the method further comprises:
   determining, by the terminal device, a candidate PDCCH set corresponding to each number of retransmissions of the paging PDCCH;
   wherein each candidate PDCCH in the candidate PDCCH set comprises R consecutive PDCCH monitoring occasions for each SSB beam, R being a number of retransmissions of the paging PDCCH on each SSB beam.

2. The method of claim 1, wherein for a first SSB beam, Rmax/R candidate PDCCHs are included in Rmax PDCCH monitoring occasions corresponding to the first SSB beam;
   wherein Rmax is the maximum number of retransmissions of the paging PDCCH on each SSB beam.

3. The method of claim 2, wherein the Rmax PDCCH monitoring occasions corresponding to the first SSB beam are sequentially numbered from zero, and PDCCH monitoring occasions corresponding to an i-th candidate PDCCH for R retransmissions of the paging PDCCH comprise: PDCCH monitoring occasions from a number (i−1)*R to a number i*R−1.

4. The method of claim 1, further comprising:
   detecting, by the terminal device, the paging PDCCH on the candidate PDCCH set according to the number of retransmissions of the paging PDCCH on each SSB beam.

5. The method of claim 1, wherein a retransmission manner of the paging PDCCH comprises that:
   for the maximum number of the PDCCH monitoring occasion, starting from a first PDCCH monitoring occasion and taking S consecutive PDCCH monitoring occasions as a group, a first group of PDCCH monitoring occasions corresponds to a first retransmission of the paging PDCCH on S SSB beams, a second group of PDCCH monitoring occasions corresponds to a second retransmission of the paging PDCCH on the S SSB beams, an m-th group of PDCCH monitoring occasions corresponds to an m-th retransmission of the paging PDCCH on the S SSB beams, and an Rmax-th group of PDCCH monitoring occasions corresponds to an Rmax-th retransmission of the paging PDCCH on the S SSB beams;
   wherein Rmax is the maximum number of retransmissions of the paging PDCCH on each SSB beam, S is the number of SSB beams on which the network device transmits the paging PDCCH, and 2<m<Rmax.

6. The method of claim 1, wherein a retransmission manner of the paging PDCCH comprises that:
   for the maximum number of the PDCCH monitoring occasion, starting from a first PDCCH monitoring occasion and taking Rmax consecutive PDCCH monitoring occasions as a group, a first group of PDCCH monitoring occasions corresponds to Rmax retransmissions of the paging PDCCH on a first SSB beam, a second group of PDCCH monitoring occasions corresponds to Rmax retransmissions of the paging PDCCH on a second SSB beam, a j group of PDCCH monitoring occasions corresponds to Rmax retransmissions of the paging PDCCH on a j-th SSB beam, and an S-th group of PDCCH monitoring occasions corresponds to Rmax retransmissions on an S-th SSB beam;
   wherein Rmax is the maximum number of retransmissions of the paging PDCCH on each SSB beam, S is the number of SSB beams on which the network device transmits the paging PDCCH, and 2<j<S.

7. A terminal device, comprising:
   a processor, and a memory configured to store a computer program capable of running on the processor, wherein the processor is configured to:
   determine a Physical Downlink Control Channel (PDCCH) monitoring occasion on at least one Synchronization Signal Block (SSB) beam, wherein a maximum number of the PDCCH monitoring occasion is a product of a number of SSB beams on which a network device transmits a paging PDCCH and a maximum number of retransmissions of the paging PDCCH on each SSB beam,
   wherein the processor is further configured to determine a candidate PDCCH set corresponding to each number of retransmissions of the paging PDCCH;
   wherein each candidate PDCCH in the candidate PDCCH set comprises R consecutive PDCCH monitoring occasions for each SSB beam, R being a number of retransmissions of the paging PDCCH on each SSB beam.

8. The terminal device of claim 7, wherein for a first SSB beam, Rmax/R candidate PDCCHs are included in Rmax PDCCH monitoring occasions corresponding to the first SSB beam;
   wherein Rmax is the maximum number of retransmissions of the paging PDCCH on each SSB beam.

9. The terminal device of claim 8, wherein the Rmax PDCCH monitoring occasions corresponding to the first SSB beam are sequentially numbered from zero, and PDCCH monitoring occasions corresponding to an i-th candidate PDCCH for R retransmissions of the paging PDCCH comprise: PDCCH monitoring occasions from the number (i−1)*R to the number i*R−1.

10. The terminal device of claim 7, wherein the processor is further configured to:
    detect the paging PDCCH on the candidate PDCCH set according to the number of retransmissions of the paging PDCCH on each SSB beam.

11. The terminal device of claim 7, wherein a retransmission manner of the paging PDCCH comprises that:
    for the maximum number of the PDCCH monitoring occasion, starting from a first PDCCH monitoring occasion and taking S consecutive PDCCH monitoring occasions as a group, a first group of PDCCH monitoring occasions corresponds to a first retransmission of the paging PDCCH on S SSB beams, a second group of PDCCH monitoring occasions corresponds to a second retransmission of the paging PDCCH on the S SSB beams, an m-th group of PDCCH monitoring occasions corresponds to an m-th retransmission of the paging PDCCH on the S SSB beams, and an Rmax-th group of PDCCH monitoring occasion corresponds to an Rmax-th retransmission of the paging PDCCH on the S SSB beams;
    wherein Rmax is the maximum number of retransmissions of the paging PDCCH on each SSB beam, S is the number of SSB beams on which the network device transmits the paging PDCCH, and 2<m<Rmax.

12. The terminal device of claim 7, wherein a retransmission manner of the paging PDCCH comprises that:
    for the maximum number of the PDCCH monitoring occasion, starting from a first PDCCH monitoring occasion and taking Rmax consecutive PDCCH monitoring occasions as a group, a first group of PDCCH monitoring occasions corresponds to Rmax retransmissions of the paging PDCCH on a first SSB beam, a second group of PDCCH monitoring occasions to corresponds to Rmax retransmissions of the paging PDCCH on a second SSB beam, a j group of PDCCH monitoring occasions corresponds to Rmax retransmissions of the paging PDCCH on a j-th SSB beam, and an S-th group of PDCCH monitoring occasions corresponds to Rmax retransmissions of the paging PDCCH on an S-th SSB beam;
    wherein Rmax is the maximum number of retransmissions of the paging PDCCH on each SSB beam, S is the number of SSB beams on which the network device transmits the paging PDCCH, and 2<j<S.

* * * * *